(12) United States Patent
Ahn (10) Patent No.: US 6,181,504 B1
(45) Date of Patent: Jan. 30, 2001

(54) METHOD FOR MEASURING TRACK PITCHES OF A HARD DISK DRIVE

(75) Inventor: Young-Shun Ahn, Suwon (KR)

(73) Assignee: SamSung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/864,271

(22) Filed: May 27, 1997

(30) Foreign Application Priority Data

May 27, 1996 (KR) .................................................. 96/18011

(51) Int. Cl.[7] .................................................. G11B 5/596
(52) U.S. Cl. .................................. 360/77.04; 360/77.02; 360/77.08
(58) Field of Search .................................. 360/75, 77.08, 360/77.02, 77.04, 78.04, 78.14

(56) References Cited

U.S. PATENT DOCUMENTS

| | | | |
|---|---|---|---|
| 4,843,491 | 6/1989 | Otokawa | 360/73.07 |
| 5,109,306 | 4/1992 | Mase et al. | 360/77.04 |
| 5,111,349 | * 5/1992 | Moon | 360/78.07 |
| 5,146,373 | 9/1992 | Wakui et al. | 360/77.01 |
| 5,241,433 | 8/1993 | Anderson et al. | 360/77.04 |
| 5,576,909 | 11/1996 | Dierkes et al. | 360/78.09 |
| 5,581,420 | 12/1996 | Chainer et al. | 360/75 |
| 5,615,058 | * 3/1997 | Chainer et al. | 350/75 X |
| 5,731,924 | * 3/1998 | Yun | 360/77.08 |
| 5,940,240 | * 8/1999 | Kupferman | 360/77.08 |

* cited by examiner

Primary Examiner—Andrew L. Sniezek
(74) Attorney, Agent, or Firm—Robert E. Bushnell, Esq.

(57) ABSTRACT

A hard disk drive (HDD) magnetically reading and writing digital data, and measuring the track pitch of a hard disk drive to detect more accurately the position error signal on each disk. The track pitches are calculated according to heads and zones, and compared with a reference track pitch as measured and averaged over all of the disks. The track pitches corresponding to the calculated track pitches are updated when detecting the calculated track pitches are the same for less than the reference track pitch. The track pitches corresponding to the calculated track pitches measured in accordance with head number and zone number are updated when detecting that the calculated track pitches are greater than the reference track pitch.

14 Claims, 6 Drawing Sheets

METHOD FOR MEASURING TRACK PITCHES OF A HARD DISK DRIVE

CLAIM OF PRIORITY

This application makes reference to, incorporates the same herein, and claims all benefits accruing under 35 U.S.C. §119 from an application for METHOD FOR MEASURING TRACK PITCHES OF A HARD DISK earlier filed in the Korean Industrial Property Office on the 27$^{th}$ day of May 1996 and there duly assigned Ser. No. 18011/1996, a copy of which application is annexed hereto.

BACKGROUND OF THE INVENTION

1. Field of the Invention

The present invention concerns a hard disk drive (HDD) for magnetically reading and writing digital data, and more particularly to a technique for measuring the track pitches of a hard disk drive to detect more accurately the position error signal on each disk.

2. Description of the Related Art

Generally, the value of a position error signal (PES) captured by detecting the HDD's burst signals is determined by the resolution of the analog/digital (A/D) converter. The maximum and minimum values of the PES are also determined by the resolution of the A/D converter.

Therefore, the percentage value of the PES is determined not by the actually measured track pitch, but only by the absolute value(constant) based on the resolution of the A/D converter. Usually, the track pitch may vary depending upon the margins of the heads, the characteristics of the recording medium and the servo write and the like. Accordingly, when the track pitches vary according to apparatuses, circuits or environment, the accuracy of the percentage values of the PES can't be guaranteed. Therefore, in order to obtain the accuracy of the percentage values of the PES, it is desirable to measure the track pitch.

The desired track pitch measurement can be conveniently executed by randomly selecting a head and a cylinder from among a number of heads and cylinders. However, the accuracy of such measurement method is only guaranteed on the assumption that the burst signal amplitudes of any inner, mid and outer zones on any one of disks are the same, and the flying heights on each of the zones and the read margins of any one of the heads are also the same.

However, the assumptions differ from the practice. Namely, the amplitudes of the burst signals and the flying heights of the heads vary depending on the inner, mid and outer zones, and the read margins of the heads are different by bits. Consequently, when measuring the track pitches by randomly selecting heads and cylinders, there are measuring errors depending on the characteristics of the heads and cylinders. If the errors are very small, they can be ignored, but if the errors are greater, they may present serious problems. For example, if the detected PES exceeds the specified limit, off-track writing may be caused. Therefore, it is necessary to provide for the track pitch measuring errors.

The following patents each disclose features in common with the present invention but do not teach or suggest the specifically recited technique for measuring the track pitches of a hard disk drive to detect more accurately the position of signal on each disk of the present invention: U.S. Pat. No. 5,581,420 to Chainer et al., entitled Method And System For Determining A Radial Positioning Valve Used For Writing Tracks At A Desired Track Pitch, U.S. Pat. No. 5,146,373 to Wakui et al., entitled Information Signal Reproducing Apparatus With Function Of Detecting Track Pitch, U.S. Pat. No. 4,843,491 to Otokawa, entitled Recording And Reproducing Apparatus With Track Pitch Detection, U.S. Pat. No. 5,241,433 to Anderson et al., entitled Disk Drive Servo Control, U.S. Pat. No. 5,576,909 to Dierkes et al., entitled Method For Positioning A Data Transducer Head In A Rotating Disk Drive Data Storage Device, and U.S. Pat. No. 5,109,306 to Mase et al., entitled Track Access Control System For Magnetic Disk System With Periodic Track Offset Update.

SUMMARY OF THE INVENTION

It is an object of the present invention to provide a technique for precisely measuring the track pitches in order to more accurately detect the position error signals.

It is another object of the present invention to provide a technique for measuring the track pitches by heads and by zones in order to more accurately detect the position error signals.

According to the present invention, the track pitches are measured by heads and zones, and then the newly measured track pitches are compared with the reference track pitch measured as the average track pitch over all of the disks. If the result shows that the measured track pitches are less than or equal to the reference track pitch, the corresponding track pitches are updated with the reference track pitch. However, if the measured track pitches are greater than the reference track pitch, the corresponding track pitches are updated on the track pitches newly measured in accordance with heads and zones.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
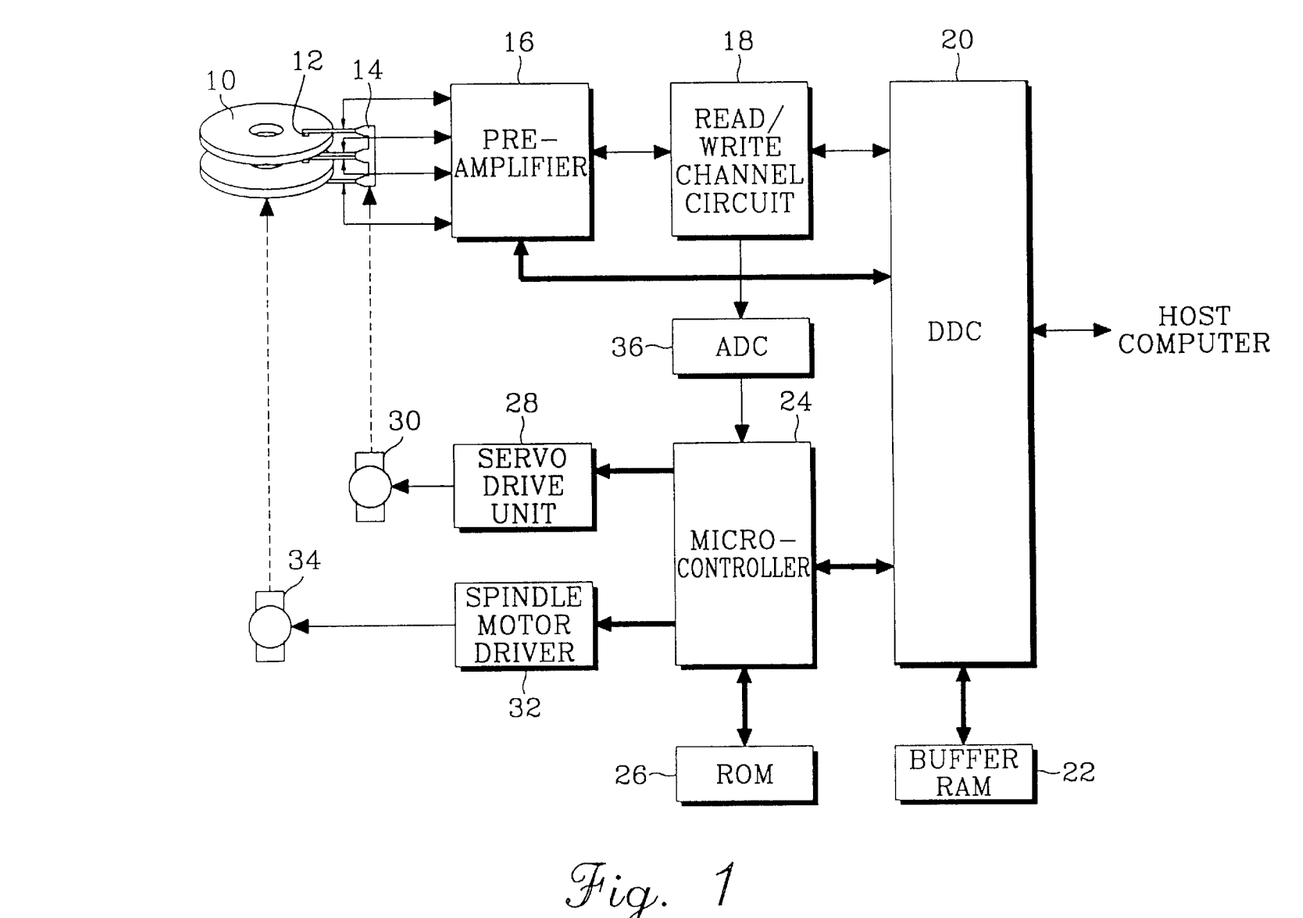
FIG. 1 is a block diagram illustrating a hard disk drive.

Referring to FIG. 1, the disks 10 are rotated by a spindle motor 34. The heads 12 are positioned each in close vicinity to the corresponding disk surfaces respectively, and further mounted each on the corresponding fore-ends of the support arms extending towards the disks 10 from an E-block assembly 14 coupled to a rotary voice coil actuator 30. When reading, a preamplifier 16 amplifies the signals picked up by one of the heads 12 in advance and supplies the amplified analog read signals to a read/write channel circuit 18, and when writing, the preamplifier 16 transmits the encoded write data delivered from the read/write channel circuit 18 to the corresponding one of the heads 12 so as to be written on the disk. The read/write channel circuit 18 detects and decodes the data pulses from the read signals delivered from the preamplifier 16, and supplies the decoded data pulses to a disk data controller (DDC) 20, and reversely decodes the write data delivered from the DDC 20, and supplies the decoded write data to the preamplifier 16.

The DDC 20 writes data received from the host computer on the disks through the read/write channel circuit 18 and the preamplifier 16, or reads data from the disks to transmit to the host computer. The DDC 20 interfaces between the host computer and a microcontroller 24. A buffer RAM 22 temporarily stores data transferred between the host computer, the microcontroller 24 and the read/write channel circuit 18. The microcontroller 24 controls the track seeking and following operations in response to the read or write instructions. A ROM 26 stores the execution program of the microcontroller 24 and the various setting values. A servo drive unit 28 generates and supplies a driving current to the rotary voice coil actuator 30 for driving the actuator 30 according to the signals generated by the microcontroller 24 for controlling the positions of the heads 12. The rotary voice coil actuator 30 moves the heads 12 on the disks 10 according to the direction and level of the driving current supplied from the servo drive unit 28. A spindle motor driver 32 drives the spindle motor 34 in response to the control values generated by the microcontroller 24 for controlling the rotation of the disks 10, thereby rotating the disks 10. An analog to digital converter (ADC) 36 converts the PES transmitted from the read/write channel circuit 18 into a digital signal and supplies it to the microcontroller 24.

Figure 2A:
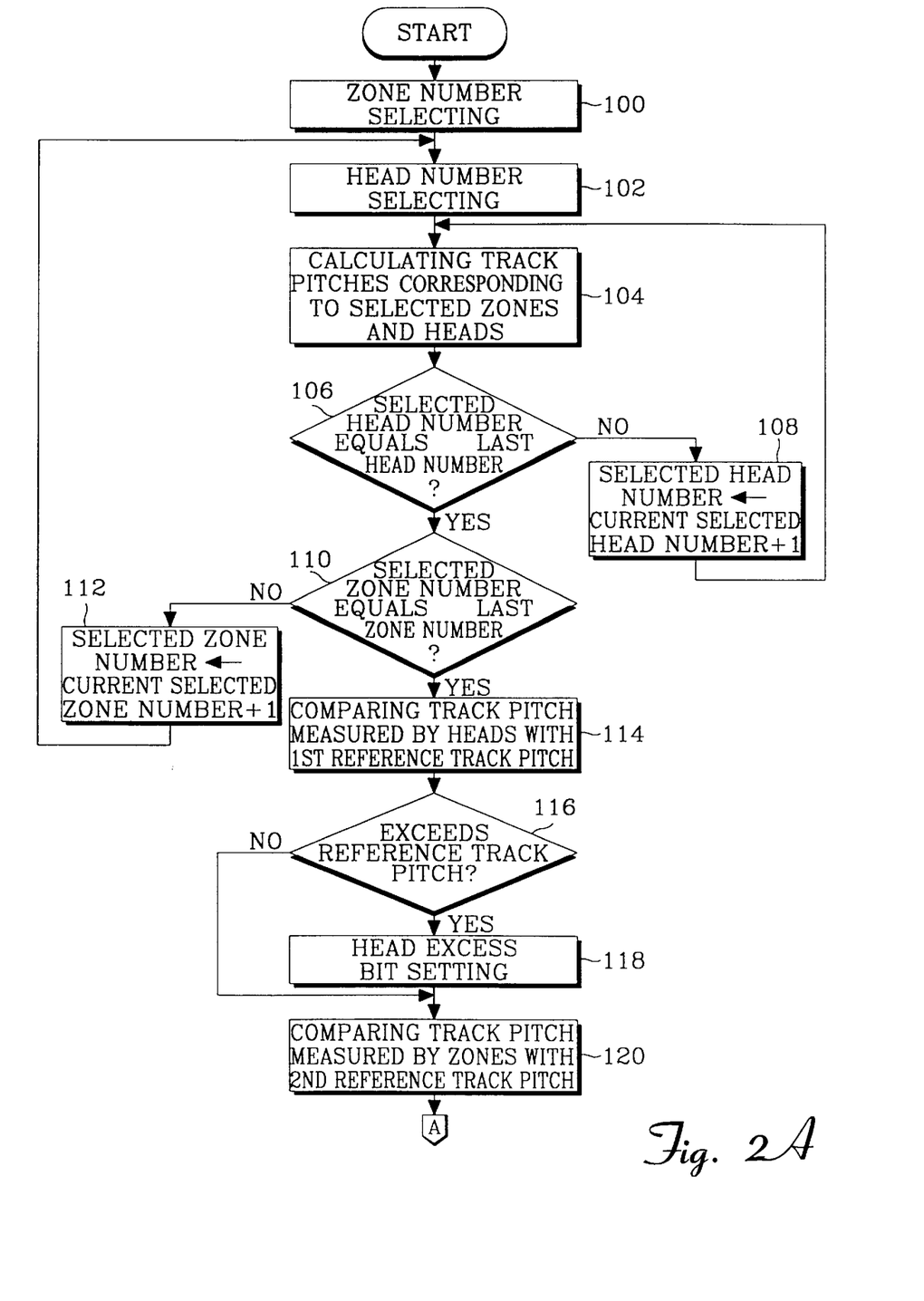
FIGS. 2A and 2B together form a flowchart for an embodiment of the present invention.
Figure 2B:
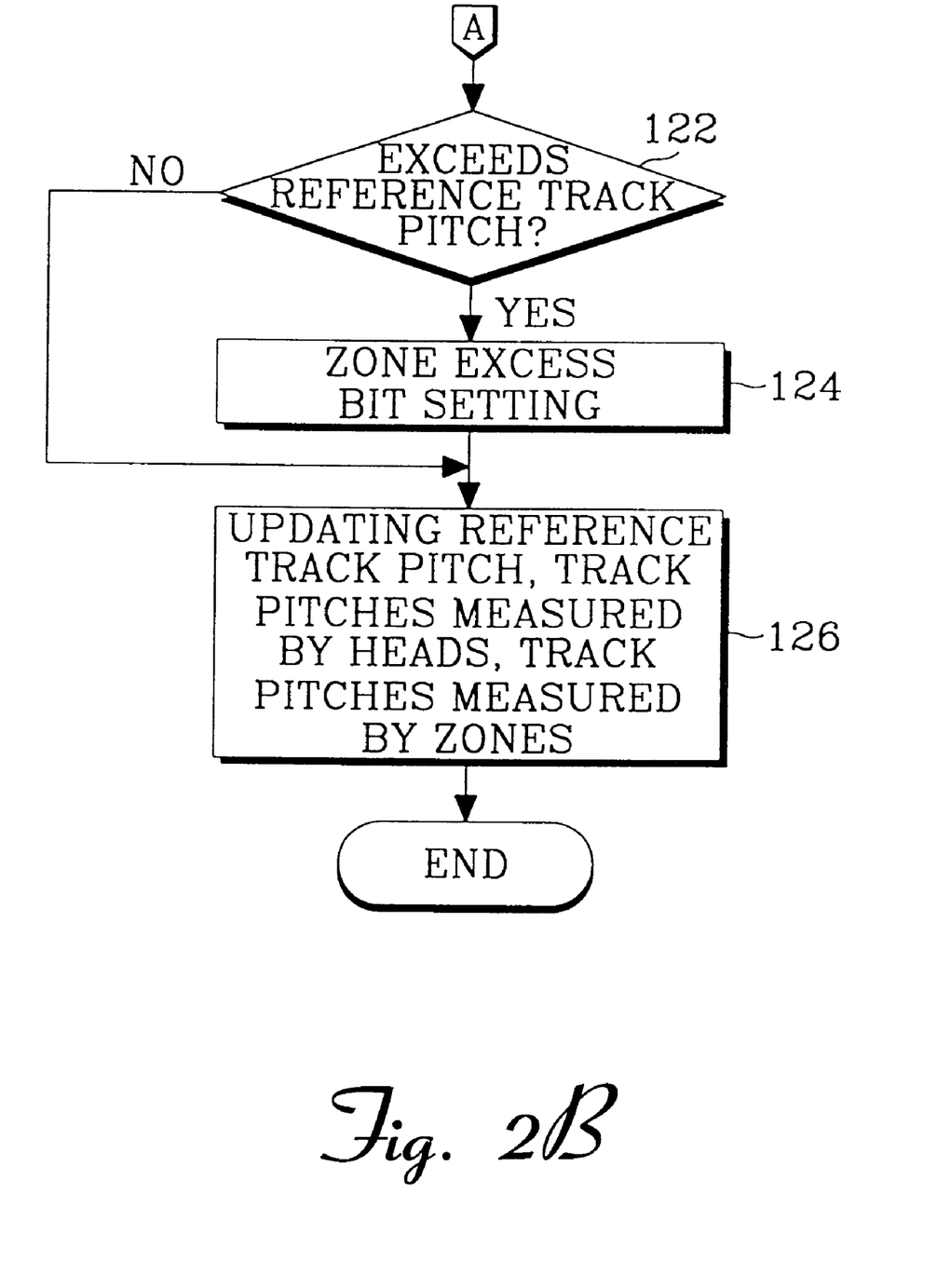

FIGS. 2A and 2B illustrate a routine which measures the track pitch in order to accurately detect the PES from the HDD. The above routine comprises the first step of calculating the track pitches measured by heads and zones, the second step of comparing the above calculated track pitches with the reference track pitch as the average track pitch of the entire disks, the third step of updating the track pitches with the reference track pitch when the newly measured track pitches are equal to or less than the reference track pitch, and the fourth step of updating the track pitches corresponding to the track pitches newly measured in accordance with head number and zone number when the newly measured track pitches exceed the reference track pitch.

Referring to FIGS. 1, 2A and 2B, the following assumptions are provided for the better understanding of the track pitch measurement according to an embodiment of the present invention. The four heads are head 1, head 2, head 3 and head 4, and the three zones of each disk are zone 1, zone 2 and zone 3.

Referring to FIGS. 2A and 2B, in order to measure the track pitches, the microcontroller 24 selects zone 1 in Step 100. Then, zone 1 on all disks 10 are selected. The microcontroller 24 then proceeds to Step 102 to select head 1, whereby head 1 is selected from among the four heads 12. Accordingly, zone 1 corresponding to head 1 is selected through Steps 100–102 by the microcontroller 24.

Thereafter, the microcontroller 24 proceeds to Step 104 to calculate the track pitch on the disk surface of zone 1 corresponding to head 1, and storing the calculated results in its internal memory. The track pitch calculating routine for the selected zones and heads is explained later in detail with reference to FIGS. 4A and 4B.

Further, the microcontroller 24 proceeds to Step 106 to determine whether the selected current head number equals the last head number. If not, the microcontroller 24 proceeds to Step 108 to set the next selected head number by adding 1(one) to the selected current head number and then returns to Step 104 to repeat the operation again from Step 104.

Assuming that the last head number is "4", since the selected current head number is "1", the microcontroller 24 performs Step 108 to select the next head number "2". When the next selected head number is set to "2", the microcontroller 24 performs Step 104 to calculate the track pitch on the disk surface of zone 1 corresponding to head 2, and stores the calculated result in its internal memory. Thereafter, the track pitch on the disk surface of zone 1 corresponding to head 3 is calculated and stored in the internal memory. Likewise, the track pitch on the disk surface of zone 1 corresponding to head 4 is calculated and stored in the internal memory. Finally in Step 106, when the selected current head number equals to the last head number, i.e. "4" in the above assumption, the microcontroller 24 proceeds to Step 110.

The steps from 100 to 108 are the processes for calculating the track pitches on the disk surfaces of zone 1 by heads. In Step 110, the microcontroller 24 determines whether the selected zone number equals the last zone number. If not, the microcontroller 24 proceeds to Step 112, and sets the next zone number by adding 1 to the selected current zone number. Then, the microcontroller 24 returns to Step 102 to repeat the operation again from Step 104. Assuming that the last zone number is "3", since the current selected zone number is "1", the microcontroller 24 performs Step 112 to set the next zone number to "2", and then proceeding to Step 102.

The microcontroller 24 repeats the steps from Step 102 to Step 112 until the current selected zone number equals the last zone number, so that all the track pitches are calculated by zones and by heads. Namely, the track pitches on the disk surfaces of zone 1, zone 2 and zone 3 corresponding to head 1 are measured and calculated and stored in the internal memory. Likewise, the track pitches on the disk surfaces of the three zones corresponding to the remaining heads 2, 3 and 4 are measured and calculated and stored in the internal memory.

When the selected zone number equals the last zone number, the microcontroller 24 proceeds to Step 114 to compare the track pitches measured by heads with the first reference track pitch as measured and averaged over all of the heads. The microcontroller 24 then proceeds to Step 116 to determine whether the track pitches measured by each of the selected heads exceed the first reference track pitch. If any, the microcontroller 24 sets in Step 118 the head excess bit to the track pitches measured by the corresponding heads.

The microcontroller 24 proceeds to Step 120 to compare the track pitches measured by zones with the second reference track pitch as measured and averaged over all of the zones, and then proceeds to Step 122 to determine whether the track pitches measured by each of the selected zones exceed the second reference track pitch. If any, the microcontroller 24 sets in Step 124 the zone excess bit to the track pitches measured by the corresponding zones.

Thereafter, the microcontroller 24 proceeds to Step 126 to update the reference track pitch, the track pitches measured by heads and the track pitches measured by zones on the respective disk surfaces corresponding to the heads and/or zones depending on the presence of the head excess bit settings and/or the zone excess bit settings, whereby the updating cases are described as follows:

Firstly, in case that all heads are set to the head excess bit, and all zones are set to the zone excess bit, all the track pitches measured by all heads and zones are updated. Secondly, in case that specific heads are only set to the head excess bit, and all zones are set to the zone excess bit, only the track pitches measured by the specific heads are updated, and all the track pitches measured by all zones are all updated. Thirdly, in case that all heads are set to the head excess bit, and specific zones are only set to the zone excess bit, all the track pitches measured by all heads are updated, and only the track pitches measured by the specific zones are updated. Fourthly, in case that only specific heads and zones are set to the head and zone excess bits, only the track pitches measured by the specific heads and zones are updated. For the remaining track pitches measured by heads and zones not set to the head and zone excess bits, the reference track pitches measured and averaged by heads and zones are employed as the track pitches.

Accordingly, when the track pitch measurements are executed under the considerations of the characteristics of each of the heads and zones according to the procedure as shown in FIGS. 2A and 2B, the track pitches can be precisely measured. In addition thereto, if the heads and zones each represent average characteristics, the memory space required can be considerably economized because the prescribed track pitch is employed.

Figure 3:
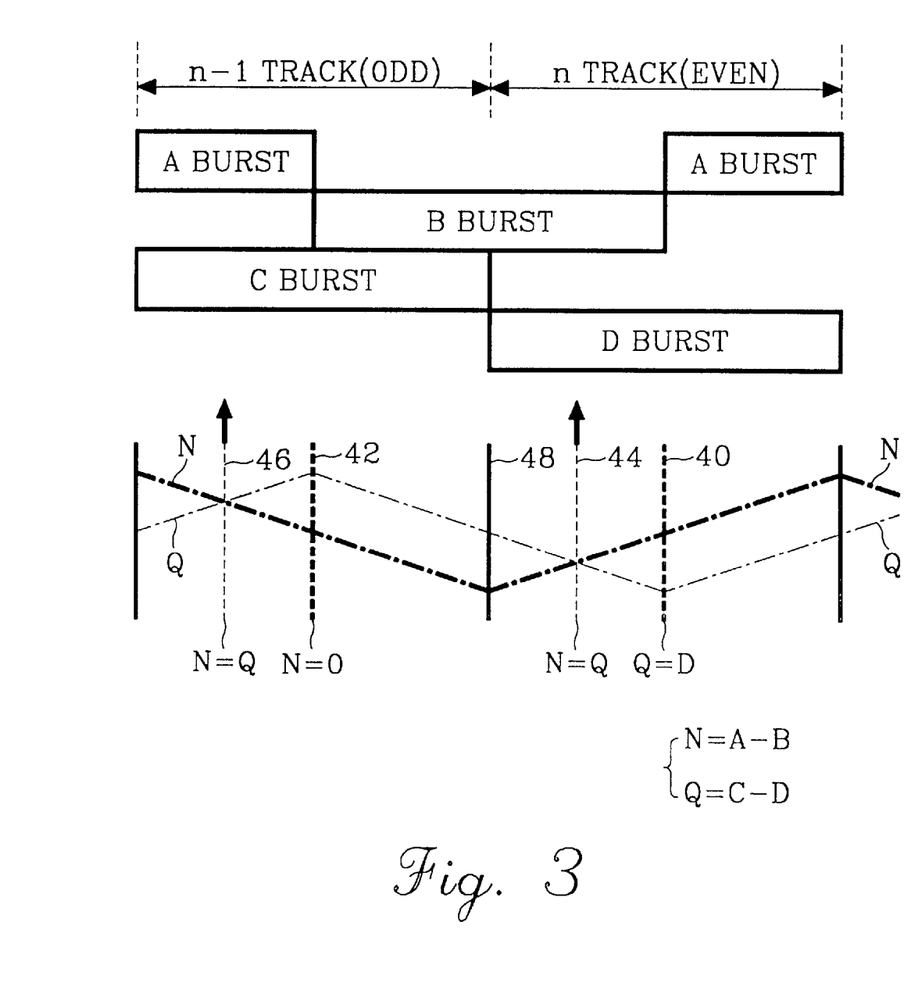
FIG. 3 is an explanatory chart for explaining N and Q expressed in the track pitch measurement according to the present invention.

The track pitch calculating process performed in Step 104 shown in FIGS. 2A and 2B will be now explained in detail by means of a preferred embodiment of the present invention. FIG. 3 illustrates two adjacent tracks, i.e. n−1 track (odd number) and n track (even number). Both tracks have A burst, B burst, C burst and D burst respectively for generating the position error signals. The A bursts are positioned on each ½ region in the opposite outer sides of the n−1 and n tracks, and the B bursts are positioned on each ½ region in the adjacent inner sides of the n−1 and n tracks. The C burst is positioned only on the n−1 track region, and the D burst only on the n track region.

Referring to FIG. 3, the N and Q are defined as follows:

$$N = A - B$$

$$Q = C - D$$

Where A, B, C, and D are A burst, B burst, C burst and D burst respectively.

FIG. 3 illustrates the magnitudes of N and Q values in each of n−1 track and n track. In the center line 42 of n−1 track, N value equals to (N=0), and in the center line 40 of n track, Q value equals to D (Q=D).

Referring to FIGS. 1, 3, 4A and 4B, the calculation operation for the measured track pitches is performed by the microcontroller 24. In Step 200, the microcontroller 24 controls the servo motor to seek the first object track, i.e. n track. Accordingly, when the heads 12 seek the first object track, the microcontroller 24 checks in Step 202 whether the seek operation is completed, by judging from the servo signals retrieved from the disks 10.

Figure 4A:
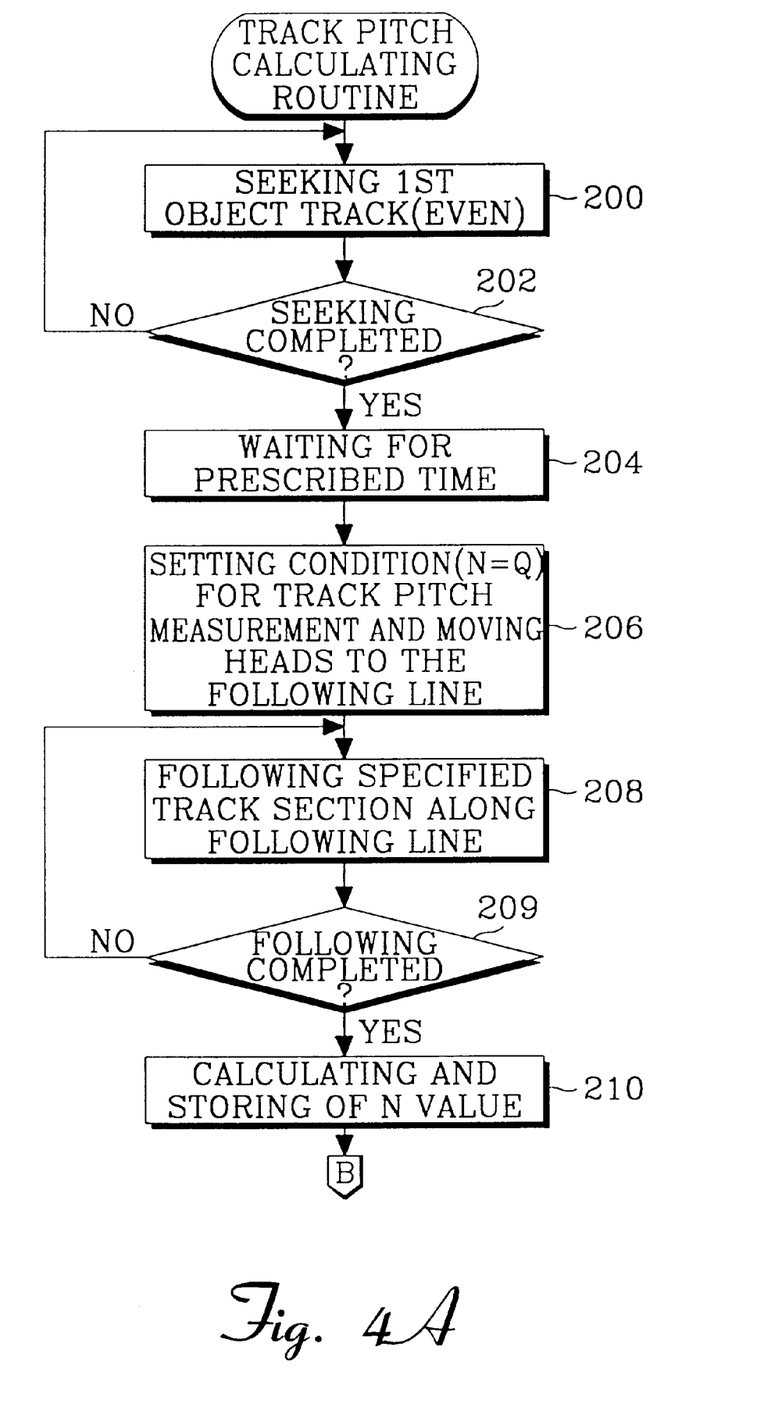
FIGS. 4A and 4B together form a flowchart of a routine for calculating the measured track pitch in Step 104 as shown in FIG. 2A according to the present invention.
Figure 4B:
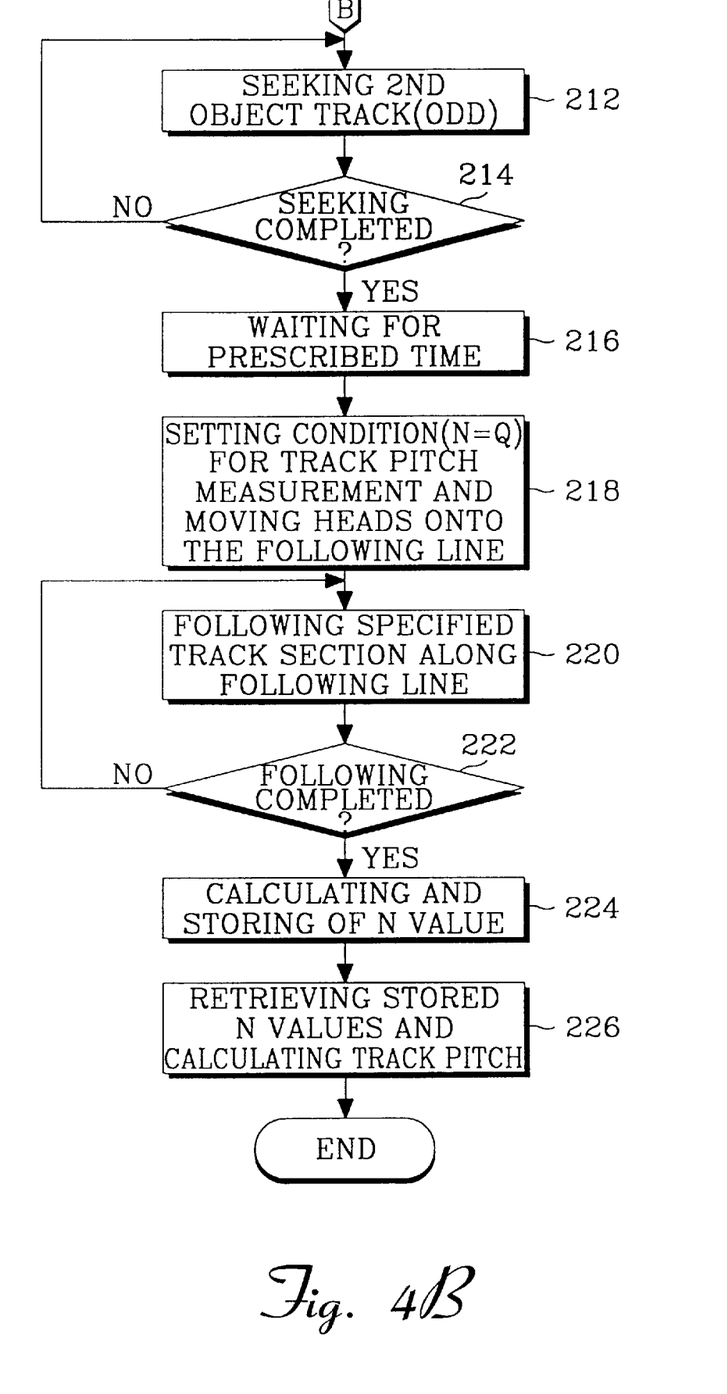

When the completion of the seeking operation is confirmed in Step 202, the microcontroller 24 proceeds to Step 204 to wait for a specified time so as to stabilize the seeking operation and to secure the accuracy of the track pitch measurement, and further proceeds to Step 206. In Step 206, the microcontroller 24 sets the track pitch measuring condition and controls the heads to move according to the condition. The track pitch measuring condition is N=Q.

Referring to FIGS. 3, 4A and 4B, before Step 206 is performed, the heads 12 are positioned in the vicinity of the first object track, i.e. the center line 40 of n track shown in FIG. 3. When the microcontroller 24 sets the track pitch measuring condition as N=Q in Step 206, the heads 12 move to the line 44(hereinafter referred to as "following line") for the following operation. The following line 44 is in the center between the center line 40 of n track and the borderline 48 adjacent to n−1 track, thereby running parallel to the latter both lines. The values of N and Q on the following line 44 represent N=Q.

When the heads are positioned on the following line 44 in Step 206, the microcontroller 24 proceeds to Step 208 so as to follow a specified section of n track along the following line 44, and further proceeds to Step 209 to check whether the following operation of the specified section of n track has been completed. When the following operation has been completed, the microcontroller 24 proceeds to Step 210 to calculate and store the N value. When moving along the following line 44, the A is not detected, and the B is detected only for half the value(½), where N equals to A−B. Accordingly, the N value is $$\frac{B}{2}.$$

Thereafter, the microcontroller 24 proceeds to Step 212 to control the servo motor so as to seek the second object track, i.e. n−1 track. Accordingly, the head 12 seeks the second object track, and then the microcontroller 24 proceeds to Step 214.

The operations from Step 214 to Step 224 are similar to the above operations from Step 202 to Step 210. In Steps 214+224, the microcontroller 24 follows the following line 46 of n−1 track to calculate the N value. When moving along the following line 46, the B is not detected, and the A is detected only half the value(½), where N equals to A−B. Accordingly, the N value is $$\frac{A}{2}.$$

Then, the microcontroller 24 proceeds to Step 226 to calculate the track pitch by adding the N value $$\left(\frac{B}{2}\right)$$

obtained from n track(calculated in Steps 200–210) to the N value $$\left(\frac{A}{2}\right)$$

obtained from n−1 track(calculated in Steps 212+224). Accordingly, the track pitch becomes $$\frac{A+B}{2}.$$

The track pitch calculations as shown in FIGS. 4A and 4B are performed for each of selected zones and heads, and the results are stored in the memory in Step 104. For convenience' sake, although the numbers of heads and zones are assumed to be four and three respectively in the above description of an embodiment, the present invention doesn't limit the numbers of heads and zones, and it will be apparent to those skilled in the art that many changes and modifications may be made thereto without departing from the spirit of the present invention.

Accordingly, when the track pitch measurements are performed under consideration of the characteristics of each of the heads and zones according to the present invention, the track pitches can be precisely measured. Furthermore, if each of heads and zones represent average characteristics, the memory space required can be considerably economized because the prescribed track pitch is employed.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of measuring track pitches of a hard disk drive to detect more accurately the position error signals on each disk, comprising the steps of:

calculating said track pitches in accordance with selected heads and selected zones of said hard disk drive, each one of said zones being a distinct portion of each disk of said hard disk drive, each one of said heads corresponding with a surface of one of said disks;

comparing said track pitches calculated according to heads with a first reference track pitch, said first reference track pitch being measured and averaged over all of the disks according to heads;

comparing said track pitches calculated according to zones with a second reference track pitch, said second reference track pitch being measured and averaged over all of the disks according to zones;

employing said first reference track pitch to said compared track pitches calculated according to heads when calculation of track pitches do not exceed said first reference track pitch;

employing said second reference track pitch to said compared track pitches calculated according to zones when calculation of track pitches do not exceed said second reference track pitch; and updating only track pitches corresponding to the comparing steps of heads and zones when calculation of track pitches exceed any one of said first or second reference track pitches.

2. The method of claim 1, further comprising the steps of:

calculating half the value of a track pitch by following a first object track, and one of the adjacent tracks, as the condition for measuring said track pitch;

calculating half the value of said track pitch by following a second object track, and another one of the adjacent tracks, as the condition for measuring said track pitch; and obtaining the value of said track pitch by adding half the value of said track pitch calculated from said first object track to half the value of a track pitch calculated from said second object track.

3. The method of claim 1, further comprising:

said step of comparing said track pitches calculated according to heads further comprising the step of assigning first excess bits to all track pitches measured in accordance with said heads of said disk drive when calculation of said track pitch exceeds said first reference track pitch;

said step of comparing said track pitches calculated according to zones further comprising the step of assigning second excess bits to all track pitches measured in accordance with said zones of said disk drive when calculation of said track pitch exceeds said second reference track pitch; and said step of updating only track pitches further comprising:

updating all said track pitches measured by all heads and zones when all track pitches measured in accordance with said heads are set to said first excess bit, and all track pitches measured in accordance with zones are set to said second excess bit;

updating only said track pitches measured by a specific head when said specific track pitches are set to said first excess bit, and updating all said track pitches measured by all zones having said second excess bit;

updating all said track pitches having first excess bits measured by all heads, and updating only said track pitches measured by the specific zones when only specific track pitches measured by specific zones are set to said second excess bit; and updating only said track pitches measured by specific heads and zones when only specific track pitches are set to said first and second excess bits.

4. A method, comprising the steps of:

determining track pitches corresponding to selected zones for selected heads of a hard disk drive comprising a microcontroller, one of said selected zones being a distinct portion of each disk in a hard disk drive, one of said selected heads corresponding with one of said selected zones, said microcontroller selecting said zones and heads;

storing calculated track pitches in a memory of said hard disk drive;

generating a first referenced track pitch by measuring and averaging over all heads for one of said selected zones of said hard disk drive;

comparing track pitches obtained for corresponding ones of said selected heads and one of said selected zones to said first referenced track pitch;

setting a first excess bit of one of said selected heads to said track pitches measured in accordance with each selected head that exceed said first reference track pitch;

comparing track pitches measured in accordance with each one of said selected zones and one of said selected heads to a second referenced track pitch, said second referenced track pitch measured and averaged over all zones for one of said selected heads of said hard disk drive;

setting a second excess bit of one of said selected zones to said track pitches measured in accordance with each selected zone that exceeds said second reference track pitch; and updating only track pitches corresponding to the comparing and setting steps of heads and zones when any one of said first or second excess bit is present.

5. The method of claim 4, further comprising:

updating said track pitches measured in accordance with heads by said first reference track pitch when said first excess bit is not present.

6. The method of claim 5, further comprising:

updating said track pitches measured in accordance with zones by said second reference track pitch when said second excess bit is not present.

7. The method of claim 4, wherein determining track pitches further comprising the steps of:

determining half the value of a track pitch by following a first object track, and one of the adjacent tracks, as the condition for measuring said track pitch;

determining half the value of said track pitch by following a second object track, and another one of the adjacent tracks, as the condition for measuring said track pitch; and obtaining the value of said track pitch by adding half the value of said track pitch determined from said first object track to half the value of a track pitch determined from said second object track.

8. The method of claim 4, wherein determining track pitches further comprising the steps of:

positioning an A burst on opposite outer sides of a first track and a second track, said first track adjacent to said second track;

positioning a B burst on each half region in adjacent inner sides of first and second tracks;

positioning a C burst only on said first track;

positioning a D burst only on said second track;

setting the track pitch measuring condition by said microcontroller, said measuring condition being when subtracting said B burst signal from said A burst has the same value as subtracting said D burst signal from said C burst;

moving said head of said hard disk drive along a line of said second track according to said measuring condition;

storing a first value of said B burst signal subtracted from said A burst while moving heads on said second track;

moving said head of said hard disk drive along a line of said first track according to said measuring condition;

storing a second value of said B burst signal subtracted from said A burst while moving heads on said first track; and determining said track pitch by having said microcontroller adding half of said first value with half of said second value.

9. An apparatus, comprising:

a plurality of disks storing data and having a plurality of zones, each one of said zones being a distinct portion of each one of said disks;

a plurality of heads reading and writing data to said disks with each one of said heads corresponding to each one of said zones; and a microcontroller controlling seeking and following the tracks in response to a read or write instruction from a disk data controller, said microcontroller controlling the movement of said disks and said heads, said microcontroller determining track pitches to detect more accurately position error signals on each disk, said microcontroller determining track pitches corresponding to selected zones for selected heads of said apparatus, one of said selected zones being a distinct portion of each disk in said apparatus, one of said selected heads corresponding with one of said selected zones, said microcontroller selecting said zones and heads, said microcontroller storing calculated track pitches in a memory of said apparatus, said microcontroller generating a first referenced track pitch by measuring and averaging over all heads for one of said selected zones of said apparatus, said microcontroller comparing track pitches obtained for corresponding ones of said selected heads and one of said selected zones to said first referenced track pitch, said microcontroller setting a first excess bit of one of said selected heads to said track pitches measured in accordance with each selected head that exceed said first reference track pitch, said microcontroller comparing track pitches measured in accordance with each one of said selected zones and one of said selected heads to a second referenced track pitch, said second referenced track pitch measured and averaged over all zones for one of said selected heads of said apparatus, said microcontroller setting a second excess bit of one of said selected zones to said track pitches measured in accordance with each selected zone that exceeds said second reference track pitch, and said microcontroller updating only track pitches corresponding to the comparing and setting steps of heads and zones when any one of said first or second excess bit is present.

10. The apparatus of claim 9, further comprising:

a pre-amplifier during a read operation, providing an amplified analog signal to a read and write circuit from signals read by one of said heads and during a write operation, said pre-amplifier transmitting encoded write data delivered from said read write circuit to one of said heads allowing data to be written to one of said disks corresponding to said head;

said read and write circuit detecting and decoding data pulses from the read signals delivered from said pre-amplifier while sending the decoded data pulses to said disk data controller and decoding write data from said disk data controller to said pre-amplifier;

said disk data controller transmitting data from a host computer to said read and write circuit and interfacing the host computer with said microcontroller; and said memory temporarily storing data transferred between the host computer, said microcontroller and said read and write circuit, said memory storing measurements of track pitches, the track pitches being the distance between adjacent tracks on a surface of one of said disks.

11. The apparatus of claim 10, with said microcontroller updating said track pitches measured in accordance with heads by said first reference track pitch when said first excess bit is not present.

12. The apparatus of claim 11, with said microcontroller updating said track pitches measured in accordance with zones by said second reference track pitch when said second excess bit is not present.

13. The apparatus of claim 12, with said microcontroller determining half the value of a track pitch by following a first object track, and one of the adjacent tracks, as the condition for measuring said track pitch, said microcontroller determining half the value of said track pitch by following a second object track, and another one of the adjacent tracks, as the condition for measuring said track pitch; and said microcontroller obtaining the value of said track pitch by adding half the value of said track pitch determined from said first object track to half the value of a track pitch determined from said second object track.

14. The apparatus of claim 13, with said microcontroller positioning an A burst on opposite outer sides of a first track and a second track, said first track adjacent to said second track, said microcontroller positioning a B burst on each half region in adjacent inner sides of first and second tracks, said microcontroller positioning a C burst only on said first track, said microcontroller positioning a D burst only on said second track, said microcontroller setting the track pitch measuring condition by said microcontroller, said measuring condition being when subtracting said B burst signal from said A burst has the same value as subtracting said D burst signal from said C burst, said microcontroller moving said head of said apparatus along a line of said second track according to said measuring condition, said microcontroller storing a first value of said B burst signal subtracted from said A burst while moving heads on said second track, said microcontroller moving said head of said apparatus along a line of said first track according to said measuring condition, said microcontroller storing a second value of said B burst signal subtracted from said A burst while moving heads on said first track; and said microcontroller determining said track pitch by having said microcontroller adding half of said first value with half of said second value.

* * * * *